(12) United States Patent
Gagnon

(10) Patent No.: US 6,648,019 B2
(45) Date of Patent: Nov. 18, 2003

(54) AIR MASS FLOW CONTROLLER

(75) Inventor: Frèdèric Gagnon, Chatham (CA)

(73) Assignee: Siemens Automotive Inc. (CA)

( * ) Notice: Subject to any disclaimer, the term of this patent is extended or adjusted under 35 U.S.C. 154(b) by 7 days.

(21) Appl. No.: 09/986,756

(22) Filed: Nov. 9, 2001

(65) Prior Publication Data

US 2002/0074047 A1 Jun. 20, 2002

Related U.S. Application Data

(60) Provisional application No. 60/255,713, filed on Dec. 15, 2000, and provisional application No. 60/255,717, filed on Dec. 15, 2000.

(51) Int. Cl.$^7$ ............................................... F16K 11/24
(52) U.S. Cl. ................................. 137/883; 137/487.5
(58) Field of Search .............................. 137/883, 884, 137/487.5

(56) References Cited

U.S. PATENT DOCUMENTS

| | | | | |
|---|---|---|---|---|
| 1,472,265 A | * | 10/1923 | Bell | 137/883 |
| 3,019,815 A | * | 2/1962 | Lenardon et al. | 137/883 |
| 4,512,368 A | * | 4/1985 | Kaminaka et al. | 137/561 A |
| 4,536,104 A | * | 8/1985 | Bungert | 406/183 |
| 5,065,794 A | * | 11/1991 | Cheung | 137/883 |
| 5,241,867 A | * | 9/1993 | Cohen et al. | 73/863.41 |
| 5,325,884 A | * | 7/1994 | Mirel et al. | 137/110 |
| 5,343,841 A | * | 9/1994 | Hattori et al. | 123/403 |
| 5,353,828 A | * | 10/1994 | Troscinski | 137/15.21 |
| 5,474,102 A | * | 12/1995 | Lopez | 137/271 |
| 5,664,600 A | * | 9/1997 | Palmer | 137/501 |
| 5,934,327 A | * | 8/1999 | Nelson et al. | 137/883 |
| 6,532,978 B1 | * | 3/2003 | Muller-Korht et al. | 137/883 |

* cited by examiner

Primary Examiner—John Fox

(57) ABSTRACT

An air mass flow controller valve for fuel cells that includes an inlet, a plurality of first and second passages and at least two air mass sensors, seat positions, closure members and actuators. The inlet is disposed along a first axis and coupled to a housing, which has first and second banks of outlets disposed along second and third axes. The first and second banks of outlets are in communication with the inlet and are coupled to the plurality of first and second passages. One of the at least two air mass sensors is disposed proximate the plurality of first passages and the other one is disposed proximate the plurality of second passages. One of the at least two seat portions is disposed between the plurality of first passages and the other one is disposed between the plurality of second passages. One of the at least two closure members is disposed proximate the plurality of first passages and the other one is disposed proximate the plurality of second passages. Each closure member is movable to a plurality of positions. A first position permits air flow between the inlet and each of the plurality of first and second passages and a second position prevents communication therebetween. The at least two actuators are coupled to a respective one of the at least two closure members and responsive to a respective one of the at least two air mass sensors to move the respective closure members between the first and second positions.

16 Claims, 5 Drawing Sheets

AIR MASS FLOW CONTROLLER

CLAIM FOR PRIORITY

This application claims the benefits of U.S. Provisional Application Nos. 60/255,713 and 60/255,717, both filed on Dec. 15, 2000, which are hereby incorporated by reference in their entirety.

FIELD OF THE INVENTION

This invention relates to an air mass flow controller in general, and more particularly to an air mass flow controller valve for fuel cells containing several flow passages, each controlled independently by an associated electromechanical actuator.

BACKGROUND OF THE INVENTION

It is believed that a fuel cell consists of two electrodes sandwiched around an electrolyte. It is believed that oxygen, from air, passes over one electrode and hydrogen, from one or more storage device, passes over the other electrode, that, in a chemical reaction, generates electricity, water and heat.

The electricity generated by a fuel cell is believed to be regulated at least in part by the amount of air or oxygen delivered to the fuel cell. Where the fuel cell includes a plurality of fuel cell units, it is believed that there is a need to accurately regulate the amount of air or oxygen delivered to each fuel cell unit.

SUMMARY OF THE INVENTION

An air mass flow controller valve for fuel cells that includes an inlet, a plurality of first and second passages, and at least two air mass sensors, two seat positions, two closure members, and two actuators. The inlet is disposed along a first axis, and is coupled to a housing. The housing has a first bank of outlets disposed along a second axis and a second bank of outlets disposed along a third axis. The first and the second bank of outlets are in fluid communication with the inlet. The plurality of first passages are coupled to the first bank of outlets, and the plurality of second passages are coupled to the second bank of outlets. One of the at least two air mass sensors is disposed proximate to the plurality of first passages, and the other of the at least two air mass sensors is disposed proximate to the plurality of second passages. One of the at least two seat portions is disposed between the plurality of first passages, and the other of the at least two seat portions is disposed between the plurality of second passages. One of the at least two closure members is disposed proximate the plurality of first passages, and the other of the at least two closure members is disposed proximate the plurality of second passages. Each closure member is movable to a plurality of positions. A first position permits air flow between the inlet and each of the plurality of the first and second passages. A second position prevents communication between the plurality of the first and second passages. The at least two actuators are coupled to a respective one of the at least two closure members and are responsive to a respective one of the at least two air mass sensors in each of the plurality of the first and second passages to move a respective one of the at least two closure members between the first and second positions.

The present invention also provides a method of distributing metered airflow from an inlet to a plurality of first and second passages in a fuel cell. Each passage of the plurality of first and second passages is provided with an air mass sensor that provides a signal, which indicates measured air amount flowing in each passage of the plurality of first and second passages, a housing, and a plurality of closure members. Each closure member is contiguous to a seat portion and disposed in a respective passage of the plurality of first and second passages. Each closure member is movable by an actuator between a first position to permit flow and a second position to prevent flow. The method includes flowing air through the inlet, flowing air through the housing, determining an air amount in each passage of the plurality of first and second passages, and metering the air amount provided to each passage from the inlet as a function of a desired air amount and the air mass amount determined in each channel.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
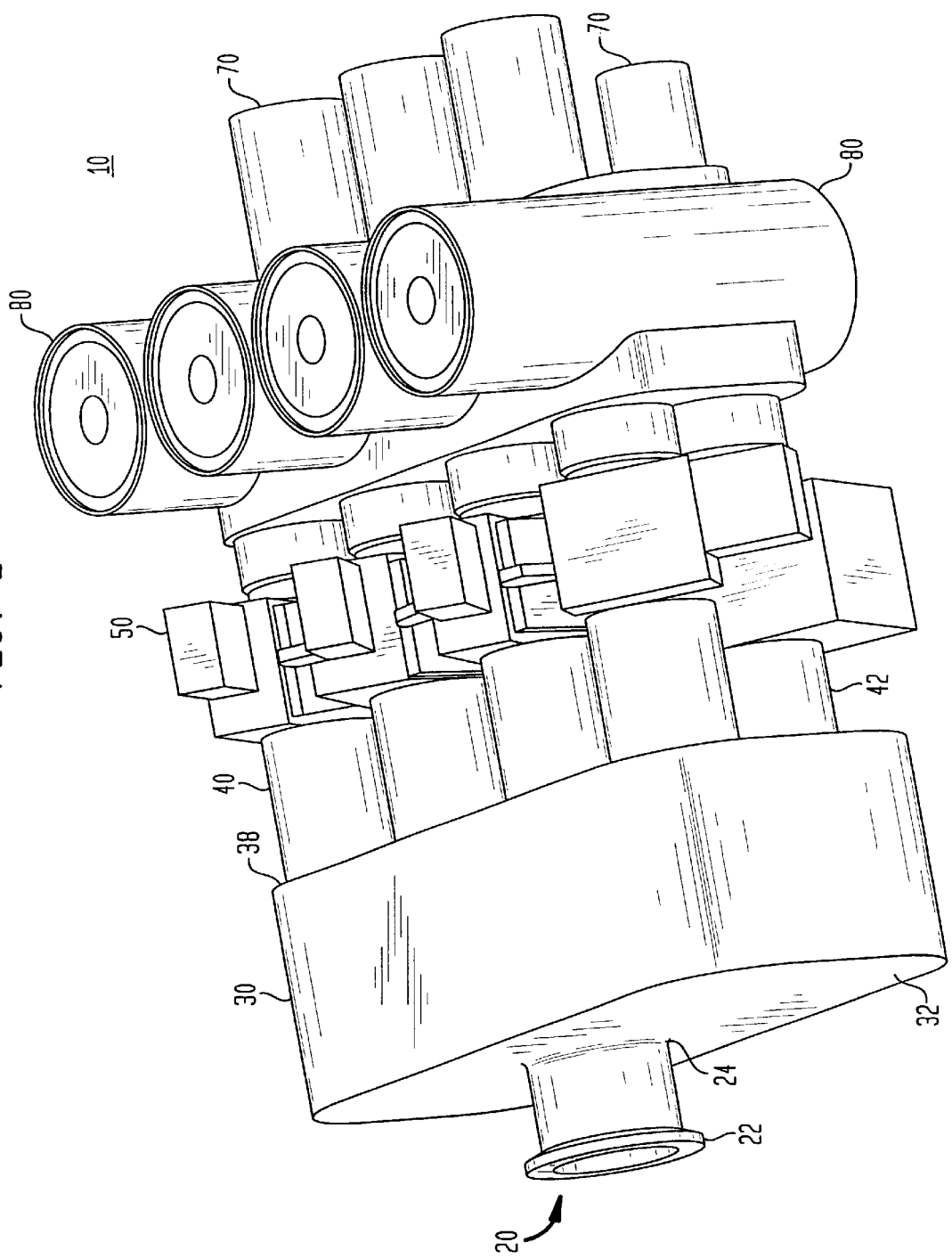
FIG. 1 is an orthogonal view of an air mass flow controller valve according to a preferred embodiment of the invention.
Figure 2:
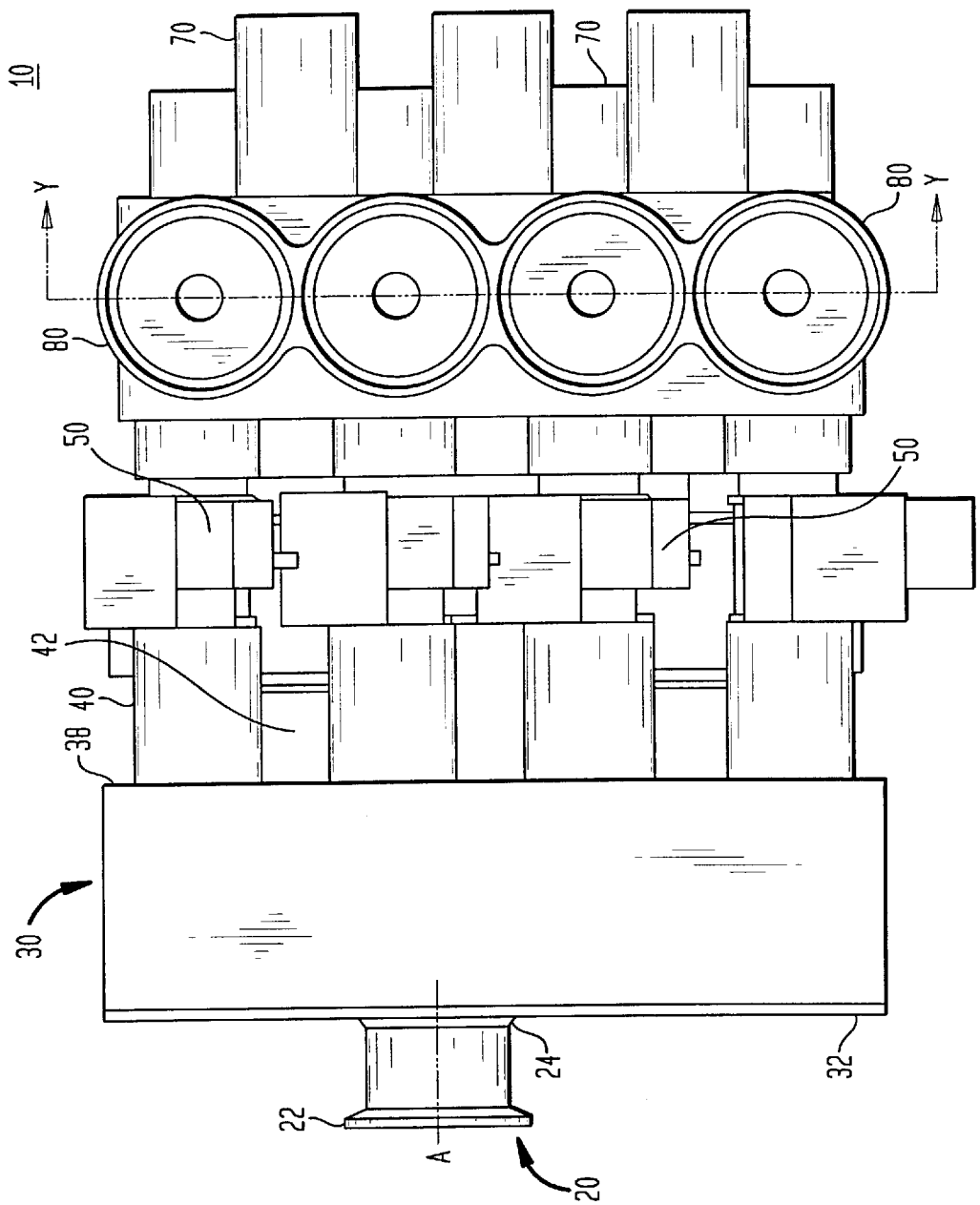
FIG. 2 is a plan view of the air mass flow controller valve.
Figure 3:
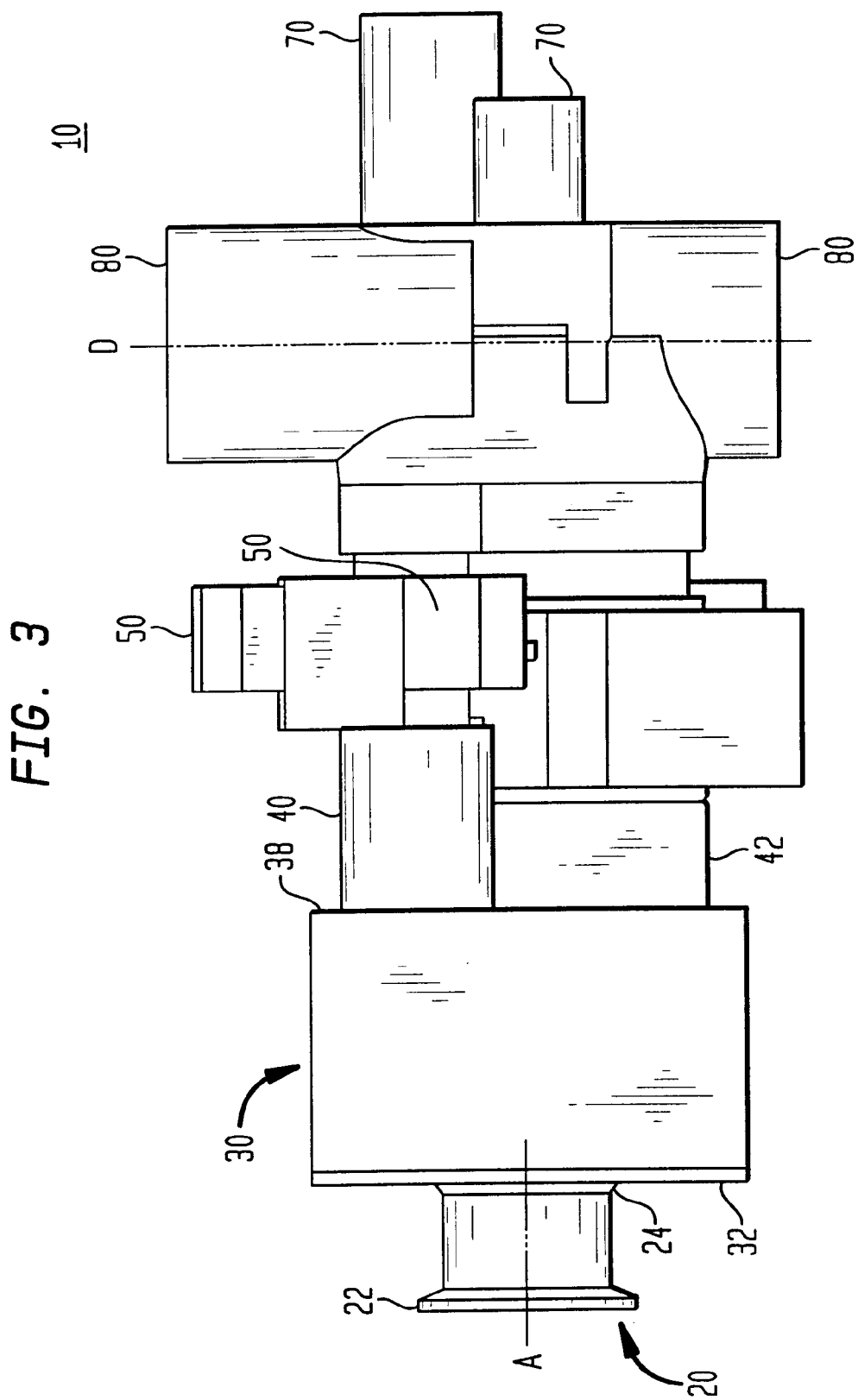
FIG. 3 is a side view of the air mass flow controller valve.
Figure 4:
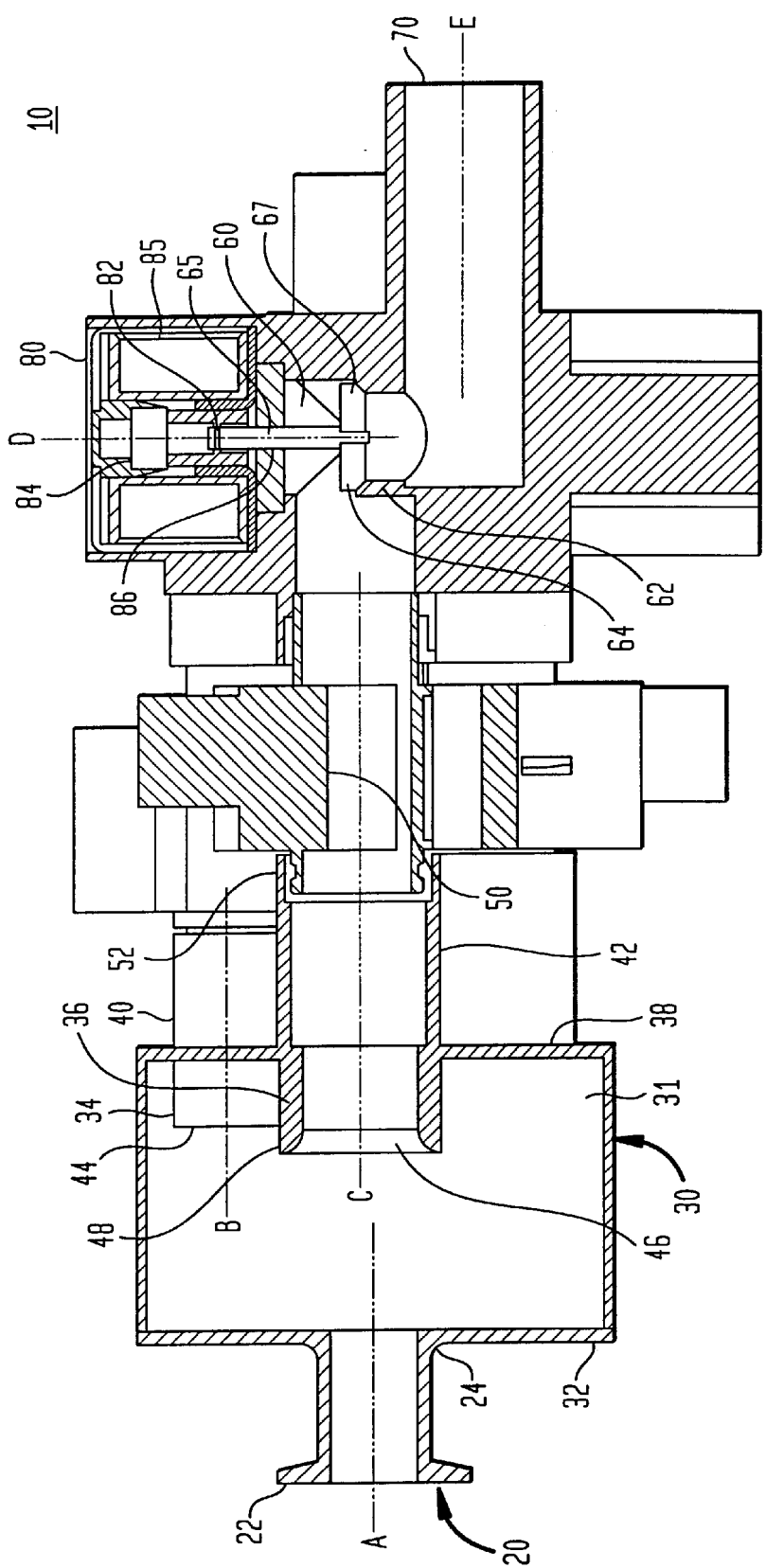
FIG. 4 is a cross-sectional view of a side view of the air mass flow controller valve of FIG. 1.
Figure 5:
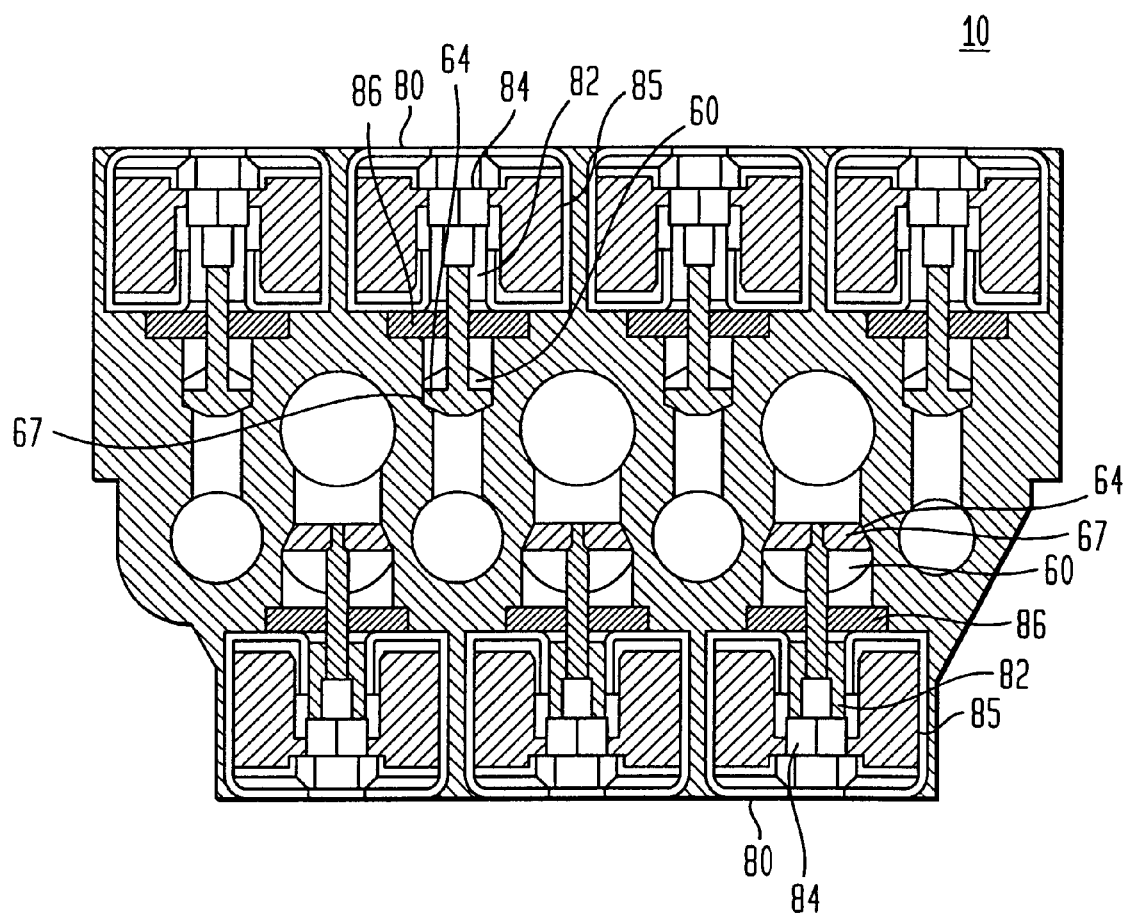
FIG. 5 is a cross-sectional view of the air mass flow controller valve along the axis Y—Y in FIG. 2.

In the drawings, like numerals are used to indicate like elements throughout. A preferred embodiment, shown in FIGS. 1–5, is an air mass flow controller valve 10 for fuel cells. The air mass flow controller valve 10 can deliver air to a reformer of a fuel cell (not shown) on board a vehicle or anywhere else that is necessary, such as, for example, in a fuel cell generating plant. In particular, as shown in the figures, the air mass flow controller valve 10 includes, preferably, an inlet 20, a plurality of first passages 52, a plurality of second passages (not shown), and at least two pressure sensors 50, two seat portions 62, two closure members 60, and two actuating devices 80. The inlet 20 is disposed along a first axis A. The inlet 20 can be a cylindrical tube. In other words, the cross-section of the inlet 20 can be circular. The cross-section of the inlet 20 can be rectangular or any other polygonal cross-sectional shape. Preferably, the cross-section of the inlet 20 is circular. The inlet 20 has an inlet portion 22, which can be a flange, and a base portion 24, which is coupled to a first wall 32 of a housing 30. A wall thickness of the inlet 20 can be substantially similar to a wall thickness of the first wall 32.

The housing 30 has walls, which define a volume. The volume of the housing 30 can be rectangular, spherical, ellipsoidal, or any other polygonal shape. Preferably, the volume of the housing 30 is rectangular. The housing 30 includes the first bank of outlets 40 disposed along a second axis B. The first bank of outlets 40 are coupled to a second wall 38 of the housing 30. The first wall 32 and the second wall 38 can be disposed opposite one another. The first bank of outlets 40 are in fluid communication with the inlet 20. Each one of the first bank of outlets 40 can be cylindrical tubes. In other words the cross-section of each one of the first bank of outlets 40 can be circular. The cross-section of each one of the first bank of outlets 40 can be rectangular or any other polygonal cross-sectional shape. Preferably, the cross-section of each one of the first bank of outlets 40 is circular. Inlet portions 34 of the first bank of outlets 40 protrude into an interior 31 of the housing 30.

The housing 30 includes a second bank of outlets 42 disposed along a third axis C. The first bank of outlets 40 can be offset from the second bank of outlets 42. The second bank of outlets 42 are coupled to the second wall 38 of the housing 30. The second bank of outlets 42 are in fluid communication with the inlet 20 as well as with the first bank of outlets 40. Each one of the second bank of outlets 42 can be cylindrical tubes. In other words the cross-section of each one of the second bank of outlets 42 can be circular. The cross-section of each one of the second bank of outlets 42 can be rectangular or any other polygonal cross-sectional shape. Preferably, the cross-section of each one of the second bank of outlets 42 is circular. Inlet portions 36 of the second bank of outlets 42 protrude into the interior 31 of the housing 30. Wall thicknesses of the inlet portions 36 of the second bank of outlets 42 can be greater than a wall thickness of the second wall 38 of the housing 30. Although not shown, wall thicknesses of the inlet portions 34 can be greater than the wall thickness of the second wall 38 of the housing 30. End portions 46 of the inlet portions 36 of the second bank of outlets 42 can include smooth radii 48. Although not shown, end portions 44 of the inlet portions 34 of the first bank of outlets 40 also include smooth radii. The end portions 46 of the inlet portions 36 of the second bank of outlets 42 and the end portions 44 of the inlet portions 34 of the first bank of outlets 40 can include sharp ends or angles. Preferably, the end portions 46 of the inlet portions 36 of the second bank of outlets 42 and the end portions 44 of the inlet portions 34 of the first bank of outlets 40 are smooth radii. Inner diameters of the inlet portions 36 that protrude into the housing 30 can be less than inner diameters of the second bank of outlets 42 that extend beyond the second wall 38 of the housing 30. Although not shown, inner diameters of the inlet portions 34 that protrude into the housing 30 can be less than inner diameters of the first bank of outlets 40 that extend beyond the second wall 38 of the housing 30.

Details of one of the plurality of second passages 52 shown will now be described. The configuration of the plurality of first passages (not shown) is substantially similar to that of the plurality of second passages 52, and thus, will not be described. The passage 52 is coupled to a distal end of one of the second bank of outlets 42. As used herein, the term "distal" refers to a position with respect to the housing 30. The passage 52 can be coupled to one of the second bank of outlets 42 by, for example, lock-fit, screws, rivets, or adhesives. Preferably, the passage 52 is coupled to one of the second banks of outlets 42 by a lock-fit, as shown. A pressure sensor 50 is disposed downstream of the second bank of passages 42. Preferably, the pressure sensor 50 is disposed on an inner wall of the passage 52. The pressure sensor 50 can be strain-gauge or piezo-electric type or resistor type sensors. A seat portion 62 can present a generally flat seating surface 64 on which a sealing member (not shown), preferably an O-ring, is disposed thereon. The seat portion 62 can include an opening extending through the seat portion 62 along a fourth axis D. A closure member 60 can be disposed, in one position proximate the sealing member (not shown) of the seat portion 62. The closure member 60 can be movable to a plurality of positions along the fourth axis D, including a first position and a second position. When the closure member 60 is in the first position, air can flow between one of the second banks of passages 42 and an exit passage 70, whereas in the second position, the closure member 60 prevents communication between one of the second banks of passages 42 and the exit passage 70. The closure member 60 can have a stem 65 that can be disposed along a fourth axis D and a seating member 67. The stem 65 and the seating member 67 of the closure member 60 can be formed as a two-piece assembly. Preferably, the stem 65 is integrally formed with the seating member 67. The seating surface 64 can be disposed in a confronting arrangement with the seating member 67 of the second closure member 60. Again, the seating surface 64 of the seat portion 62 can also include at least one sealing member (not shown), such as an O-ring, disposed between the seating surface 64 of the seat portion 62 and the seating member 67 of the second closure member 60.

In order to move the second closure member 60 to different positions along the fourth axis D, an actuating device 80 can be provided to actuate independently of the other closure members. The actuating device 80 can be pneumatic or electrical. Preferably, the actuating device 80 is electromagnetic and includes an armature assembly 82 coupled to the closure member 60. The armature 82 can be disposed and displaceable along the fourth axis D when electromotive forces are introduced into electromagnetic coil 85. The electromotive force introduced to the coil 85 induces the generation of electromagnetic flux in the electromagnetic coil 85 that flows to the armature 82. The flow of magnetic flux to the armature 82 tends to move the armature 82 toward an armature stop 84 so as to complete a magnetic circuit from the coil 85 to the armature 82, the armature stop 84, and back to the coil 85. Upon deactivation of the device 80, a sliding bearing 86 can be provided to act as a stopper for the armature 82. A position sensor (not shown) is preferably positioned on an end of the armature stop 84. Data from the pressure sensor 50 and the position sensor (not shown) can be used to determine an air mass amount.

When the device 80 is actuated, the magnitude of displacement of the armature assembly 82 is generally equivalent to the amount of air permitted to flow between one of the second banks of passages 42 and the exit passage 70. The actuating device 80 is responsive to the pressure sensor and the position sensor (not shown) to regulate the amount of air flow between the inlet 20 and the exit passage 70 as a function of target air mass amount or a target air mass flow rate. Preferably, the actuating device 80 can be controlled by electrically connecting the coil 85 to a controller (not shown) that outputs a pulsewidth-modulated signal. Here, the pulsewidth-modulated signal represents the target air mass amount or the target air mass flow rate as determined by the controller (not shown). The pulsewidth-modulated signal can be feedback controlled by a "processed signal" from one of the second pressure sensors 50 and the position sensor (not shown) to the controller (not shown). As used herein, the term "processed signal" indicates that the signal from the pressure sensor 50 and the position sensor (not shown) can be processed by an analog to digital converter, and then subsequently treated so that this processed signal can be used to determine the feedback error signal to control the actuating device 80.

Although the pressure sensor 50 and the position sensor (not shown) can be used to determine the airmass flow rate in one preferred embodiment, it is contemplated that, in another preferred embodiment, the pressure sensor 50 and the position sensor (not shown) can be replaced with a single airmass sensor (not shown) disposed in the exit passage 70. A signal from the airmass sensor (not shown) can be processed and treated such that this signal can be used to determine the feedback error signal needed to control the actuating device 80 as described above. The airmass sensor (not shown) can be a hot-wire type or a resistive type airmass sensor. Preferably, the airmass sensor (not shown) is a hot-wire type airmass sensor.

The operation of the air mass flow controller valve 10 will now be described. Specifically, in the actuating device 80, the armature 82 acts in response to signals provided by a controller or by the pressure sensor 50 and the position sensor (not shown) to regulate the flow of air by displacing the closure member 60 between the first position and the second position. In the first position, the closure member 60 is unseated. Thus, air that flows into the inlet 20 flows through the housing 30 where air flow becomes laminar and is equally distributed to the first bank of passages 40 and the second bank of passages 42. The air flows past the closure member 60 and through the plurality of exit passages 70. In the second position, the closure member 60 is seated against the seat portion 62 and the sealing member (not shown). Thus, air that flows into the inlet 20 and the housing 30 is prevented from flowing through the plurality of exit passages 70 by the seating of the closure member 60. Air flow through each of the individual passages can be regulated independently of one another by the individual actuating devices 80 and their associated closure members 60 and pressure sensors 50, and position sensors (not shown).

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An air mass flow controller valve for fuel cells, the flow controller valve comprising:

an inlet disposed along a first axis and coupled to a housing, the housing having a first bank of outlets disposed along a second axis and a second bank of outlets disposed along a third axis, the first bank and second bank of outlets being in fluid communication with the inlet;

a plurality of first passages coupled to the first bank of outlets;

a plurality of second passages coupled to the second bank of outlets;

a plurality of exit passages corresponding to each outlet in the first and second bank of outlets;

at least two air mass sensors, one of the at least two air mass sensors disposed proximate the plurality of first passages, the other of the at least two air mass sensors disposed proximate the plurality of second passages;

at least two seat portions, one of the at least two seat portions disposed between the plurality of first passages and their corresponding exit passages, the other of the at least two seat portions disposed between the plurality of second passages and their corresponding exit passages;

at least two closure members, one of the at least two closure members disposed proximate the plurality of first passages, the other of the at least two closure members disposed proximate plurality of second passages, each closure member movable to a plurality of positions, a first position permitting air flow between the inlet and each of the exit passages and a second position preventing communication between the inlet and each of the exit passages; and at least two actuators coupled to a respective one of the at least two closure members, the at least two actuators responsive to a respective one of the at least two air mass sensors in each of the plurality of the first and second passages to move a respective one of the at least two closure members between the first position and the second position.

2. The valve of claim 1, wherein the housing comprises:

a housing having walls defining a volume;

the inlet coupled to a first one of the walls;

the first bank of outlets coupled to a second one of the walls and being in fluid communication with the inlet; and the second bank of outlets coupled to the second wall and being in fluid communication with the inlet and the first bank of outlets.

3. The valve of claim 2, wherein the inlet comprises a cylindrical tube.

4. The valve of claim 2, wherein the volume defined by the housing is rectangular.

5. The valve of claim 2, wherein the first wall is disposed opposite the second wall.

6. The valve of claim 2, wherein the first bank of outlets is offset from the second bank of outlets.

7. The valve of claim 2, wherein the first bank of outlets comprises cylindrical tubes.

8. The valve of claim 7, wherein inlet portions of the first bank of outlets protrude into an interior of the housing.

9. The valve of claim 8, wherein ends of the inlet portions of the first bank of outlets include radii.

10. The valve of claim 2, wherein the second bank of outlets comprises cylindrical tubes.

11. The valve of claim 10, wherein inlet portions of the second bank of outlets protrude into an interior of the housing.

12. The valve of claim 11, wherein ends of the inlet portions of the second bank of outlets include radii.

13. The valve of claim 1, wherein each of the at least two seat portions further comprises an annular seat having a second axis transverse to the first axis.

14. The valve of claim 13, wherein the closure member is disposed proximate the annular seat, the closure member operable to move along the second axis between the first position and second position.

15. The valve of claim 14, wherein the seat portion further comprises a seating surface in a confronting arrangement with the closure member, the seating surface having at least one seal disposed between the seating surface and the closure member.

16. The valve of claim 1, wherein each of the at least of the two actuators further comprises a sliding bearing, the sliding bearing configured to permit the closure member to reciprocate between the first position and the second position.

* * * * *